Dec. 29, 1953  R. E. CRANDALL ET AL  2,664,255
HYDRAULIC LOCKING MECHANISM
Filed Feb. 14, 1949  3 Sheets-Sheet 1
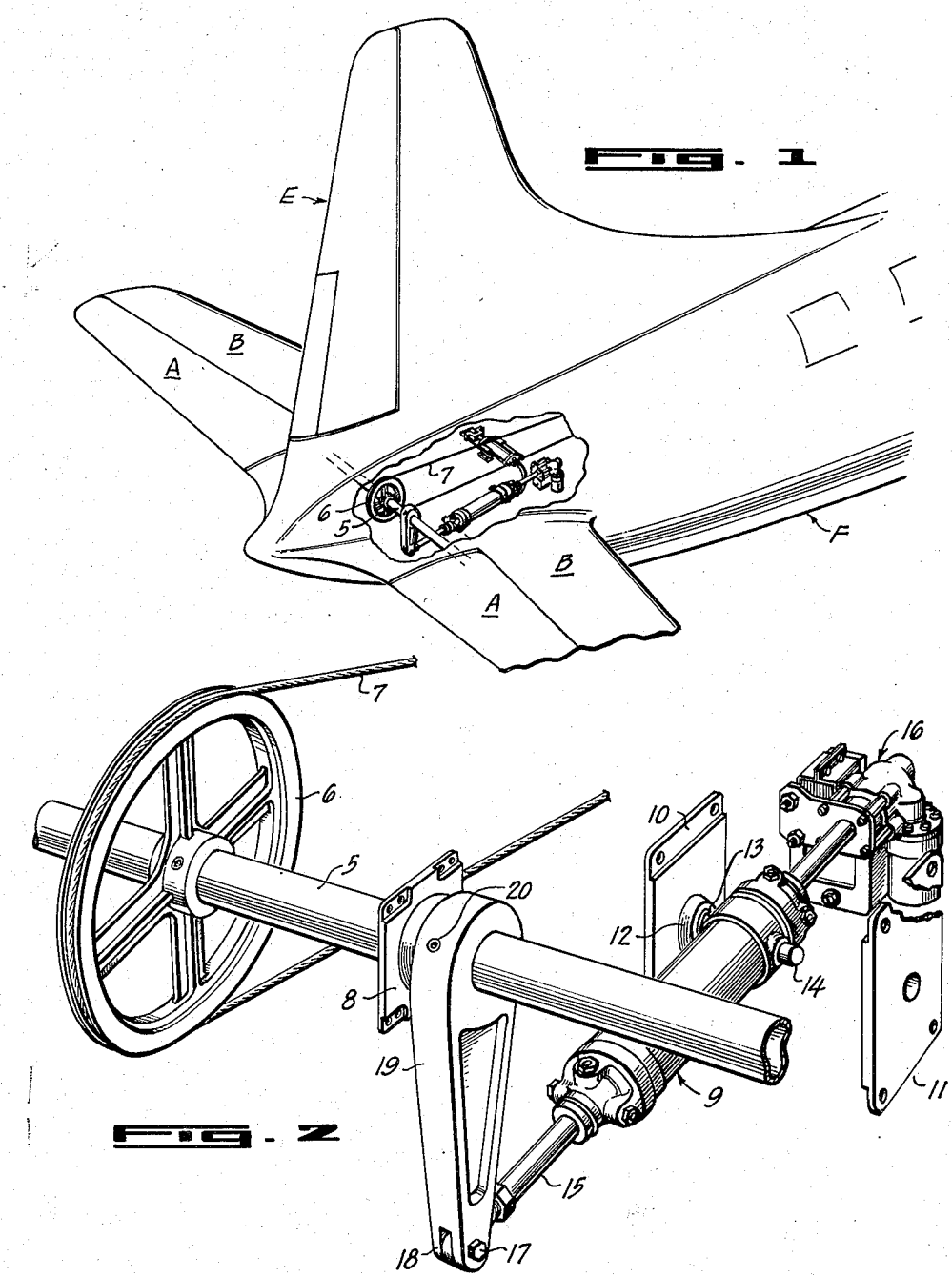
INVENTORS
Ronald E. Crandall,
BY Peter S. Kleven &
Lee E. Baldwin
ATTORNEY Dec. 29, 1953  R. E. CRANDALL ET AL  2,664,255
HYDRAULIC LOCKING MECHANISM
Filed Feb. 14, 1949  3 Sheets-Sheet 2
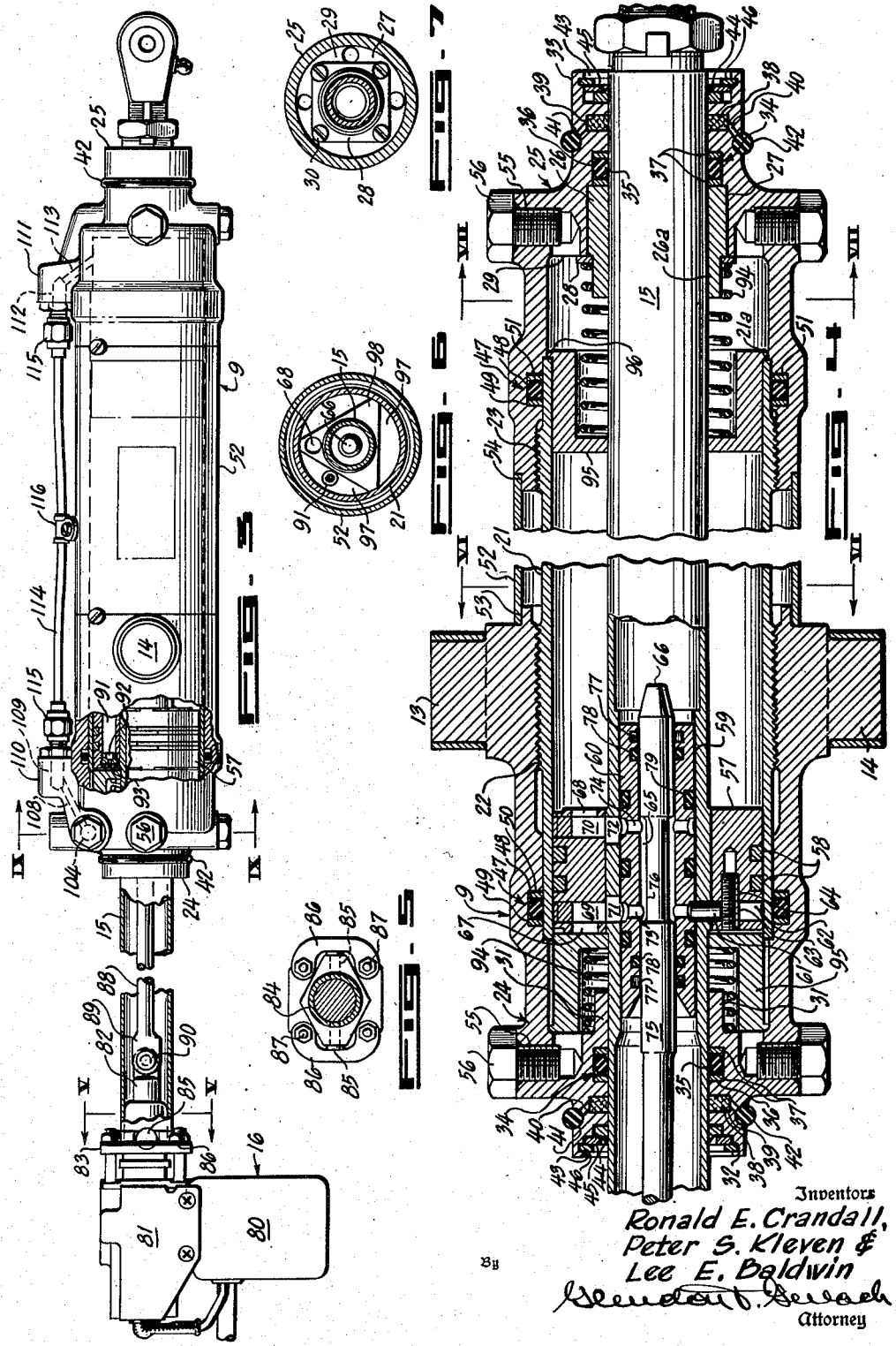
Inventors
Ronald E. Crandall,
Peter S. Kleven &
Lee E. Baldwin
By
Attorney Dec. 29, 1953   R. E. CRANDALL ET AL   2,664,255
HYDRAULIC LOCKING MECHANISM
Filed Feb. 14, 1949   3 Sheets-Sheet 3

INVENTORS
Ronald E. Crandall,
BY Peter S. Kleven &
Lee E. Baldwin
ATTORNEY

Patented Dec. 29, 1953

2,664,255

UNITED STATES PATENT OFFICE 2,664,255

HYDRAULIC LOCKING MECHANISM

Ronald E. Crandall, Los Angeles, Calif., Peter S. Kleven, Fort Worth, Tex., and Lee E. Baldwin, Los Angeles, Calif., assignors to Consolidated Vultee Aircraft Corporation, San Diego, Calif., a corporation of Delaware Application February 14, 1949, Serial No. 76,352

10 Claims. (Cl. 244—85)

The present invention relates in general to hydraulic locking mechanisms. More particularly, the invention relates to a means for controllably locking one movable element with respect to another at any point in their relative path of movement such, for example, as a means for locking an aircraft control surface to prevent damage to the surface or its supporting structure by wind gusts when the aircraft is grounded. The invention comprises essentially a hydraulic assembly having a fluid-filled cylinder adapted to be supported on one movable element, a piston, and a piston rod in the cylinder adapted for connection to another element. Locking or unlocking of the elements with respect to each other is accomplished by controlling the flow of fluid from one side of the piston to the other by means of an electrically actuated by-pass valve. Novel means are incorporated in the hydraulic assembly of the invention for maintaining the cylinder completely filled with fluid regardless of changes in fluid density due to temperature fluctuation and also means permitting the locking action to be "over-ridden" at a controlled rate of speed in the event of its malfunction.

For illustrative purposes, the invention is herein described as applied to a gust lock for aircraft control surfaces. In this application, the actuating system for the hydraulic lock embodies means for automatically unlocking the surface when the aircraft is taken off and to prevent inadvertent locking during flight.

The principal object of the present invention is to provide an improved means for controllably locking a movable element comprising essentially an electrically controlled hydraulic assembly adapted for association with the movable element and the fixed structure supporting it.

Another object of this invention is to provide an electrically controlled hydraulic locking device for movable elements that is adapted to provide locking action at any position of the movable element throughout its path of movement.

Still another object of the invention is to provide an hydraulic lock for movable elements having improved means for maintaining the fluid supply therein, regardless of changes in fluid density due to temperature fluctuation.

Still another object of the present invention is to provide an improved type of controllable lock consisting of an hydraulic cylinder and piston assembly having an electrically actuated plunger serving to lock or unlock movement of the piston by closing or opening a by-pass from one side of the piston to the other.

A further object of the invention is to provide an electrically actuated hydraulic locking means associated with an aircraft control surface to prevent movement of the surface by wind gusts while the aircraft is grounded yet providing means to control the aircraft by means of the control surface if the locking means is inadvertently engaged.

Yet another object of the invention is to provide an aircraft control surface locking system wherein the control surface is automatically released when the landing gear is relieved of the weight of the airplane on becoming airborne.

These and other objects and advantages of the present invention will become apparent from the following description and the appended drawings in which like figures of reference denote like parts throughout the several views.

Fig. 1 is a schematic view of an aircraft flight control system illustrating the present invention embodied as a gust lock for the elevators.

Fig. 2 is a perspective view of the electrically actuated hydraulic lock of the invention illustrating its connection to a control surface torque shaft and showing its pivotal mounting in relation thereto.

Fig. 3 is a side elevation of the electrically actuated hydraulic lock of the invention with certain portions broken away for clarity.

Fig. 4 is a transverse section of the hydraulic locking mechanism.

Fig. 5 is a section on line V—V of Fig. 3.

Fig. 6 is a section on line VI—VI of Fig. 4.

Fig. 7 is a section on line VII—VII of Fig. 4.

Figure 8:
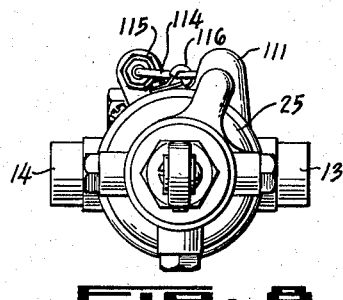
Fig. 8 is an end view of the hydraulic lock.

Referring to Fig. 1, the present invention is exemplified in connection with an aircraft elevator A supported for pivotal movement with respect to a fixed horizontal stabilizer B, the two elements forming a part of an empennage E of a fuselage F and being adapted to effect longitudinal control of an aircraft. For the purpose of illustration, the invention will be described herein as a means for locking the elevator A in angular position relative to the stabilizer B.

It is to be clearly understood, however, that the application of the present invention to gust locks for aircraft control surfaces is purely for the purpose of example and that the advantages and objects of our improved hydraulic lock may be obtained in its application to controllably lock a wide variety of movable elements with respect to their supporting structure.

In the embodiment illustrated in Fig. 1, the elevator A, which consists of a movable portion disposed on either side of the empennage E is pivotally mounted on a torque tube 5 to effect longitudinal control of the aircraft by conventional means which are represented as a control pulley 6 pinned to the torque tube 5, over which passes a cable 7 whose ends are connected to a suitable control element in the aircraft cockpit (not shown). Rotation of the pulley 6 by means of the cable 7 elevates or depresses the elevator A with respect to the stabilizer B and causes the aircraft to rise or descend.

The torque tube 5 passes through the tail cone of the fuselage F and is journalled therein by suitable bearing means attached to the aircraft structure as generally indicated by the element 8. To effect aerodynamic cleanliness, the control pulley 6 as well as the hydraulic lock of the present invention may be housed within the contours of the tail cone of the fuselage F. The hydraulic locking mechanism of the present invention includes a cylinder assembly 9 supported for pivotal movement within the fuselage F by means of a pair of bearing plates 10 and 11 which are secured to the structure of the airplane. The bearing plates 10 and 11 are provided with projections 12 bored to form journals for the pintles 13 and 14 disposed on either side of the cylinder assembly 9. A piston rod 15 disposed within the cylinder assembly 9 and adapted for axial movement therein supports an electric actuating assembly 16 at one end thereof, and the other end is connected by means of a bolt 17 to a clevis 18 formed at the free end of a lever arm 19 which is pinned at 20 for rotation with the torque tube 5.

It will thus be seen that rotation of the torque tube 5 within the practical range of movement of the elevator A is transmitted to the piston rod 15 within the cylinder assembly 9, and that the angularity of the connection is accommodated by the pivotal mounting of the cylinder assembly 9 in the bearing plates 10 and 11. Conversely, it will be evident that control of the rotation of the torque tube 5 may be effected by restraining or freeing movement of the piston rod 15 with respect to the cylinder assembly 9.

The cylinder assembly 9 is essentially an hydraulic locking means for controlling the freedom of movement of the piston rod 15 and thus the torque tube 5 and the control surfaces A, and control of its actuation is effected electrically by means of the unit 16 as will be described.

Referring particularly to Figs. 3 and 4 the cylinder assembly 9 is shown in detailed construction as comprising a tubular barrel or cylinder 21 having external threads 22 and 23 adapted to engage respectively an end cap 24 on which are integrally formed the pintles or trunnions 13 and 14, and an end cap 25. The end caps 24 and 25 are provided with bearing means to accommodate sliding movement of the piston rod 15 and sealing means to provide a fluid tight connection between the piston rod 15 and cylinder 21 at each of its ends, and to retain hydraulic fluid therein.

The bearing means in the end cap 25 consists of a bronze bushing 26 fitted into an internal bore 27 of the cap 25 and retained therein by means of a generally square flat plate 28 bearing against the inner end of the bushing 26 and secured to the inner end wall 29 of the end cap 25 by means of a number of spaced machine screws 30. (See Fig. 7.)

The end cap 24 is formed with an inner axial projection 31 and is centrally bored to form an upper bearing or journal for the piston rod 15. The bronze bearing bushing 26 in the lower end cap 25 is provided to accommodate the bending loads to which the assembly may be subjected. Since the loads are applied at the end of the piston rod 15 which passes through the lower end cap 25, a heavy duty bearing is not necessary for supporting the rod end which passes through the upper end cap 24, the material from which the cap 24 is constructed being adequate to form a suitable bearing.

The end caps 24 and 25 are provided with external bosses or projections 32 and 33 respectively which serve to increase the bearing areas for the piston rod 15 and to house fluid-tight sealing means 34 which consist of rubber O-rings 35 retained in recesses 36, having leather back-up rings 37 disposed on either side thereof to prevent extrusion of the O-rings 35 at high cylinder pressures.

The piston rod 15 is lubricated by means of felt wiper rings 38 which are positioned in a circumferential recess 39 in each of the end caps 24 and 25. Passages 40 for transmitting lubricant to the wiper rings 38 are disposed radially from the recesses 39 to connect with annular grooves 41 machined on the outer surfaces of the bosses 32 and 33, and these passages are normally protected from the entrance of dirt or other foreign matter by means of rubber rings 42 which fit into the grooves 41.

The bosses 32 and 33 of the end caps 24 and 25 are counterbored to provide end recesses 43 in which are disposed wiper rings 44 bearing on the outer surface of the piston rod 15 and serving to prevent dirt or other abrasive materials from being carried into the bearings or cylinder by movement thereof. The wiper rings 44 are retained in position by means of washers 45 and snap rings 46 engaging suitable lands in the recesses 43.

The cylinder 21 is additionally sealed against leakage from between the end caps 24 and 25 and the barrel 21 by sealing means 47 comprising rubber O-rings 48 and leather back-up rings 49 disposed on either side thereof, located in internal circumferential recesses 50 and 51 respectively and bearing against the outer surfaces of the ends of the cylinder 21.

The cylinder 21 may be protected against damage from external sources as gunfire, for example, when used in military installations, by means of an outer shell 52 supported concentrically around the cylinder 21 on annular rabbets 53 and 54 formed respectively on the inner ends of the caps 24 and 25.

Each of the end caps 24 and 25 are provided with a plurality of passages 55 communicating with the interior of the cylinder 21 and having threaded openings in the external contours thereof to accommodate sealed plug bolts 56 to permit filling and bleeding the cylinder from a number of positions.

Intermediate the ends of the piston rod 15, is secured, as by hydrogen brazing, a piston or plunger portion 57 which conforms to the internal diameter of the cylinder 21 and which is disposed in assembly within the cylinder between the end caps 24 and 25 and is adapted for reciprocal movement therein with the piston rod 15.

The piston 57 is provided with a pair of piston rings or packing rings 58 located in suitable annular lands in its outer periphery forming a seal between the portions of the cylinder 21 on either side thereof.

The piston rod 15 is generally tubular in construction and adjacent that portion which serves to support the piston 57 the wall is thickened to provide an internal bearing surface 59 in which is secured a valve sleeve 60.

The sleeve 60 is fixed against movement within the piston rod 15 by means of a pin 61 which is disposed within a hole 62 extending radially of the piston 57 through the piston rod 15 and into the side of the sleeve 60. The pin 61 is in turn locked in position by means of a headless set screw 63 located in a threaded hole 64 in the piston 57 and intersecting the hole 62.

The assembly comprising the fluid-filled cylinder 21, the piston rod 15, and the piston 57 is adapted to serve as a locking mechanism by means of the restriction or passage of the flow of hydraulic fluid from one side of the piston 57 to the other within the sealed cylinder 21. When the by-passing means is closed the piston rod 15 is effectively locked with respect to the cylinder 21 and when opened the former is freed for axial movement in the cylinder 21 at a controlled rate of speed depending upon the cross-sectional area of the by-passage.

Control of the flow of hydraulic fluid from one side of the piston 57 to the other is accomplished by means of passages extending from either side of the piston 57 to an axial bore 65 in the valve sleeve 60 in which is positioned an axially reciprocable valve body 66. Ports 67 and 68 disposed opposite to each other on the radial faces of the piston 57 communicate by short axial passages to radial passages 69 and 70 which are aligned with openings 71 and 72 through the piston rod 15 and with holes 73 and 74 in the valve seat 60 when the latter is secured in assembly as described, thus forming hydraulic channels from the ports 67 and 68 to axially spaced openings in the bore 65 of the valve sleeve 60.

The valve body 66 comprises an elongated rod having one end 75 conforming in diameter to that of the bore 65 and disposed in the valve sleeve 60. The valve end 75 is provided with an undercut portion 76 having a length somewhat greater than the axial distance between the openings of the passages 69 and 70 into the valve sleeve 60. It will thus be seen that when the valve body 66 is positioned so that the undercut portion 76 of the valve end 75 lies beneath and overlaps the inlets to the passages 69 and 70 an open passage is provided from one side of the piston 57 to the other for the flow of fluid, whereas displacement of the valve 66 so that the undercut portion 76 lies below only one of the inlets to the passages 69 and 70 closes the passages and locks movement of the piston 57 and piston rod 15 in the cylinder 21.

Each end of the valve sleeve 60 is provided with an oil saturated leather lubricating wiper ring 77 and an O-ring 78 recessed in suitable internal annular grooves to bear on the valve end 75 and prevent the leakage of fluid between the elements. A series of O-rings 79 is disposed in external annular grooves on the outer surface of the valve sleeve 60 acting as seals against the internal surface of the piston rod 15.

Movement of the valve body 66 within the piston rod 15 is effected by means of the electric actuator 16 which is secured to and supported by the upper free end of the piston rod 15. The electric actuator 16 does not per se form a part of this invention. It is shown as being representative of a number of available electrically actuated devices to accomplish limited reciprocal motion. As shown, it consists essentially of a reversible motor 80 and a gear assembly 81 which by means of a suitable power source and electrical circuit is operable to extend or retract a shaft 82 over a predetermined range of movement. A flanged mounting plate 83 of the gear assembly 81 is provided with a bore 84 accommodating the upper end of the tubular piston rod 15, and is secured thereto by means of a pair of radially disposed pins 85. Curved, flat retainer members 86 extending between pairs of studs 87 which are threaded into the housing of the gear assembly 81 are disposed over the outer ends of the pins 85 and lock them in place. The valve body 66 is provided with an elongated rod-like extension 88 formed integrally with the valve end 75, and at the opposite end thereof is flattened to form a clevis 89 adapted to be secured to the end of the shaft 82 by means of a pin 90 and to form a universal connection therewith.

While the hydraulic assembly 9 of the present invention may be utilized as heretofore described to provide a positive lock for a movable member, in some instances such as the illustrated embodiment for locking aircraft control surfaces, it is desirable to provide means for over-riding the lock and to permit controlled movement of the locked element, even though the locking mechanism is engaged. In aircraft this provision is advantageous to allow operation of the control surfaces of the aircraft in the event that the airplane is taken off with the gust locks inadvertently engaged or in the event of their becoming locked in flight through malfunctioning of the locking mechanism.

This feature is exemplified in the present embodiment by the passage 91 (Fig. 3) extending transversely of the piston 57 and serving as a port for the flow of fluid from one side thereof to the other. A threaded fitting 92 is positioned in one end of the passage 91 and is provided with metering orifice 93. The cross-sectional area of the orifice 93 is proportioned to permit a sufficient flow of fluid through the passage 91 to enable the pilot of the aircraft to manipulate the elevator A by means of the cable 7 and control pulley 6 with sufficient rapidity to effect control of the aircraft, even though the valve 66 is in a locked position. The dimensions of the metering orifice 93, however, are such that the surge of fluid in the cylinder 21 resulting from a sudden wind force on the elevator A is resisted and effectively snubbed with the hydraulic assembly in a locked condition.

The orifice 93 additionally assists in effecting a snubbing action to the movement of the piston 57 as it reaches either end of its travel in the cylinder 21 in order to prevent high deceleration of the element with which the hydraulic lock is associated, particularly when the mechanism is in an unlocked position. For this purpose, a compression spring 94 is located at each end of the cylinder 21, surrounding and supported upon the extension 31 of the upper end cap 24, and upon an inner projection 26a of the bearing 26. The springs 94 bear against the end caps 24 and 25, and against the under surfaces of a pair of generally cup-shaped plungers 95 fitted within the cylinder 21 for slideable movement on the piston rod 15, urging them when unrestrained towards the center of the assembly.

Movement of each of the plungers 95 away from the end caps 24 and 25 is limited by means of a circumferentially disposed shoulder 96 of sufficient diameter to engage the ends 21ᵃ of the cylinder 21. Both of the end faces of the piston 57 are relieved in one or more chord-shaped sectors 97 so that the thickness of the piston through these areas is less than the thickness through the unrelieved portion 98. The ports 67 and 68 are located in the unrelieved portion 98, whereas the passage 91 extends through the piston 57 within one of the relieved areas 97. When the piston 57 is moved towards the left as shown in Fig. 4, it engages the plunger 95 thus blocking off the further flow of fluid through the main by-pass channels. Since the opening to the passage 91 lies within the relieved area 97, it is unrestricted and further flow of fluid from the left-hand side of the cylinder is thus limited by the orifice 93 and the resistance of the spring 94, until the plunger 95 bottoms against the end cap 24 at the end of the stroke. The snubbing action thus provided is identical when the piston 57 is moved to the extreme right as viewed in Fig. 4, with the exception that in this case the port 68 is closed upon contact with the right hand plunger 95, the remaining fluid in the end cap 25 being forced through the orifice 93 into the left hand end of the cylinder 21.

Figure 9:
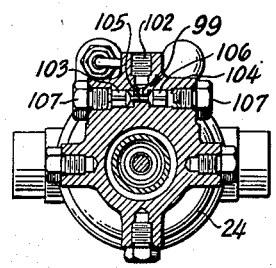
Fig. 9 is a section on line IX—IX of Fig. 3.

Proper operation of the hydraulic cylinder assembly 9 requires that it be completely filled with hydraulic fluid. Under varying thermal conditions, the fluid contracts and expands at a higher rate than the metal parts of the assembly. As a result provision is made in the present invention for automatically adding or extracting fluid from the cylinder 21 in response to temperature changes. This feature is accomplished by means of a thermal relief and replenishing valve 99, embodied as an integral component of the end cap 24 as shown in Fig. 9, connected by means of a supply pipe 100 to a spring charged reservoir 101 which maintains a constant pressure in the cylinder 21 at all times.

The thermal relief and replenishing valve 99 comprises a port 102 in the end cap 24 having a threaded connection for one end of the supply pipe 100, a pair of oppositely disposed ports 103 and 104 connected to each other by a passage 105 which is in turn in communication with the port 102, and a two-piece poppet valve 106 serving to open or close the ports 103 and 104 to the port 102 through the passage 105 in response to pressure differential in the cylinder 21. The open ends of the ports 103 and 104 in the end cap 24 are each provided with a threaded seal plug 107. The port 103 is connected to the left-hand end of the cylinder 21 (as shown in Fig. 4), by a drilled passage through the end cap 24 (not shown).

The port 103 is connected by a drilled passage 108 (Fig. 3) to a threaded opening 109 in a boss 110 on end caps 24. The opposite end cap 25 is provided with a boss 111 in which is formed a threaded opening 112. A drilled passage 113 extends from the opening 112 to the internal bore of the end cap 25, providing a tight connection to the right-hand end of the cylinder 21 as shown. A hydraulic pipe 114 connects the threaded openings 109 and 112 by means of pipe couplings 115 and is supported from the outer shell 52 by means of a clip 116. It is thus seen that the port 103 is connected to the end of the cylinder 21 formed by the cap 24, and that the port 104 is connected by means of the pipe 114 to the opposite end of the cylinder 21 formed by the end cap 25, and that both are connected to the supply port 102 by means of the passage 105.

Figure 10:
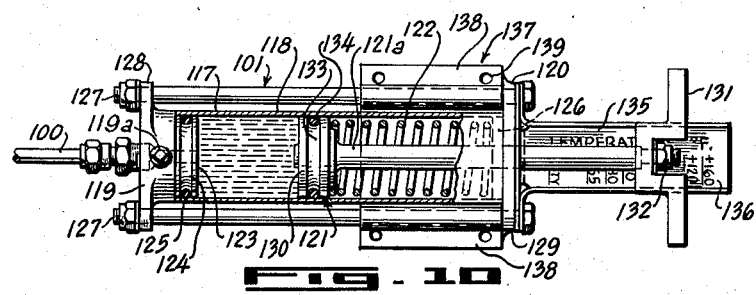
Fig. 10 is a view of the apparatus for maintaining a constant supply of fluid in the hydraulic lock assembly with certain parts broken away.
Figure 11:
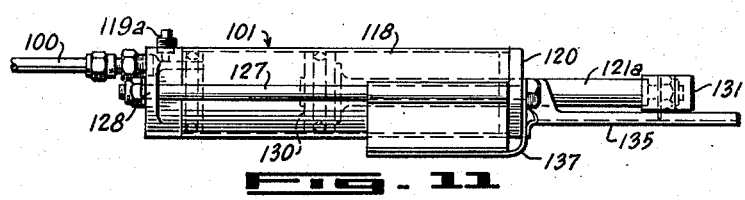
Fig. 11 is a side view thereof.

Figs. 10 and 11 illustrate the spring-charged reservoir 101, which is connected to the hydraulic assembly 9 by means of the supply pipe 100 and serves to maintain the cylinder 21 filled with hydraulic fluid at a positive pressure. The reservoir 101 consists essentially of a cylinder 117 formed of a hollow tubular barrel 118, a lower end cap 119, and an upper end cap 120, in which is positioned a piston 121, and a compression spring 122. The lower end cap 119 is provided with a circular boss 123 having an annular groove 124 in which is disposed a rubber O-ring 125. The barrel 118 is supported on the boss 123 and forms a pressure-tight seal therewith by means of the ring 125.

The upper end cap 120 is provided with a circular boss 126 which similarly accommodates the other end of the barrel 118, and the end caps 119 and 120 are held in assembled relation by means of a pair of longitudinally extending bolts 127 positioned on either side of the barrel 118 and acting between and against pairs of lugs 128 and 129 on the lower end cap 119 and upper end cap 120 respectively.

The piston 121 comprises an elongated piston rod 121ᵃ axially slideable in a suitable bearing located in the upper cap 120, a plunger 130 secured to one end of the piston rod 121ᵃ within the cylinder 117, and a gauge handle portion 131 attached to the other end by means of a nut 132. The plunger 130 has an annular groove 133 in which is disposed a rubber sealing ring 134 which bears against the internal bore of the cylinder barrel 118 and forms with the sealed end cap 119, a pressure-tight chamber for hydraulic fluid.

The compression spring 122 is positioned within the barrel 118 bearing against the end cap 120 and the "dry" side of the plunger 130.

A plate-like guage member 135 is secured to the upper end cap 120 and is positioned in such a manner that lateral movement of the gauge handle 131 will be along and coincident with a series of graduations 136 marked thereon to indicate the relative temperatures to which the volume of the fluid within the cylinder 117 and hydraulic assembly 9 correspond.

A mounting bracket 137 for the reservoir assembly 101 is supported on the bolts 127 and is provided with oppositely extending flange members 138 having mounting holes 139 for bolting the assembly to suitable surrounding structural members of the fuselage F.

The operation of the thermal relief and replenishing valve 99 and the reservoir 101 to maintain the hydraulic assembly 9 filled with hydraulic fluid is as follows:

The hydraulic assembly 9, supply pipe 100, and reservoir 101 are filled with hydraulic fluid through a filler port 119ᵃ on the reservoir end cap 119 with the gauge handle 131 of the reservoir 101 held at the graduation 136 representing the ambient temperature at the time of filling the system.

With the cylinder filled an increase in temperature will expand the fluid in the cylinder and force the excess back to the reservoir 101 through the thermal relief and replenishing valve 99, the poppet 106 serving to maintain both, or one or the other of the ports 103 and 104 open and in communication with the reservoir 101 through the passage 102. Expansion of the fluid in this condition exerts force against the piston 21 which contracts the spring 122 until equilibrium is established. The gauge handle 131 is then positioned at a graduation 136 corresponding to the existing ambient temperature. Reduced temperature contracts the fluid in the hydraulic actuator 9 and reverses the operation heretofore described. The purpose of accommodating thermal variations in the manner described is to prevent excessive pressure due to expansion and to avoid voids and air pockets resulting from contraction, either condition causing non-uniform operation of the device.

When an external force is applied to the piston rod 15, tending to move it in one axial direction or the other, a pressure is built up in the fluid on the side of the piston 57 towards which the force is exerted. This pressure displaces the poppet 106 and closes that end of the cylinder 21 to communication through the port 102 with the reservoir 101. By this means, the high pressure side of the piston 57 is automatically cut-off from the reservoir 101.

The gauge member 135 in cooperation with the gauge handle portion 131 provides a constant indicator for the amount of fluid within the system since a loss of fluid by leakage will result in a discrepancy between the temperature indicated by the graduations 136 and the known ambient temperature. In such an event, fluid is added to the system as heretofore described.

One of the principal features of the present invention resides in the provision of electrical control for the hydraulic locking mechanism.

By this means, remote control of the device may be accomplished without the added weight and cost attendant various hydraulic mechanical, or other control systems and the problem of providing automatic control elements responding to various components of the assembly in which the actuator is employed is simplified. When the invention is embodied in the locking of aircraft components as exemplified in the present specification, electrical actuation minimizes the vulnerability of the system to gunfire when utilized for military purposes.

As heretofore set forth, locking and unlocking of the hydraulic actuator 9 are effected by reciprocal movement of the valve body 66 within the piston rod 15 in response to operation of the electrical actuator 16. While the latter element may be operated from any suitable source of electrical energy and controlled by any desired combination of control elements, Fig. 12 represents a typical electrical arrangement for the operation of the invention, which embodies particular features when the device is used for locking aircraft control surfaces.

Figure 12:
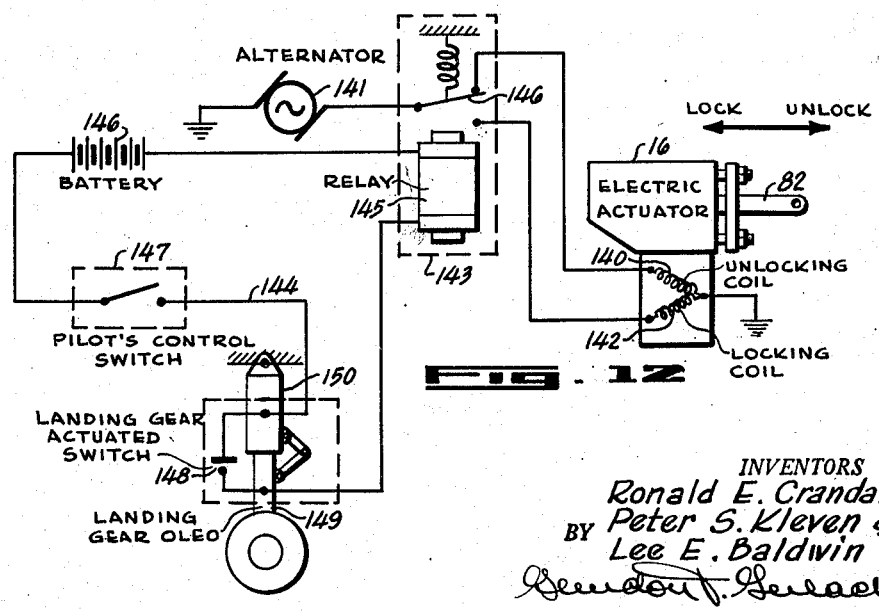
Fig. 12 is a schematic wiring diagram indicating the electrical means for controlling the hydraulic lock when used as an aircraft gust lock.

Fig. 12 schematically illustrates the control system of the invention as applied to an aircraft when in an unlocked position. The electric actuator 16 is provided with an unlocking coil 140 which when energized from a source of electrical power as represented by the generator 141, extends the shaft 82 and unlocks the hydraulic assembly 9 as heretofore described. The electric actuator 16 is also provided with a locking coil 142 which, when energized by current from the generator 141 retracts the shaft 82 and locks the hydraulic actuator. Limiting mechanism (not shown) is provided in the electric actuator assembly to break the flow of energy to either of the coils 140 or 142, when the shaft 82 has reached predetermined limits of movement.

A relay 143 is connected to the coils 140 and 142, to the generator 141, and to a control circuit 144.

When the coil 145 of the relay 143 is de-energized as shown, a spring biased switch 146 maintains connection between the generator 141 and the unlocking coil 140. When energized the switch 146 breaks the unlocking circuit and makes connection between the generator 141 and the locking coil 142. The control circuit 144 comprises a battery 146, connected to one side of the coil 145 of the relay 143, a pilot's control switch 147, and a landing gear actuated switch 148. The control switch 147 and the landing gear switch 148 are connected in series to the battery 146 and to the coil 145, to control the actuation of the latter.

The landing gear actuated switch is operated by movement of an oleo strut 149 embodied in the landing gear 150 so that the circuit through the switch 148 is broken when the oleo 149 is extended as will occur when the aircraft is in flight, and is "made" or connected when the aircraft is on the ground and its weight supported by the landing gear 150 retracts the oleo 149.

With the circuit 144 broken by either the pilot's control switch 147 or the landing gear switch 148, the relay 145 maintains energy of the generator 141 on the unlocking coil 140. When both of the switches 147 and 148 are closed, the coil 145 is energized closing the circuit between the generator 141 and the locking coil 142.

It will thus be evident that locking of the hydraulic actuator 9 is accomplished by closing of the pilot's control switch 147, but that this will only be effected if the landing gear switch 148 is closed, i. e. when the airplane is on the ground.

If the airplane is inadvertently taken off with the pilot's control switch 147 in a locked or closed position, the landing gear switch 148 will be opened by the extension of the oleo strut 149, de-energizing the relay 143 and thus automatically unlocking the hydraulic actuator 9 and releasing the control surface to which it is attached to permit free control of the aircraft.

The system thus described exemplifies locking means for aircraft control surfaces comprising a hydraulic locking assembly connected to a control surface, electrically actuated means for operating the hydraulic assembly to lock and unlock the control surface, and landing gear operated means having an operative connection with the electrically actuated means to automatically unlock the control surface when the aircraft is in flight and to prevent locking of the control surface during flight.

The herein described hydraulic lock and the electrical means for its actuation effectively and efficiently fulfill their intended purpose and their arrangement is characterized by simplicity of construction resulting in positive operation and reasonable manufacturing costs. The arrangement of the hydraulic loading mechanism 9 is further characterized by the fact that it affords a locking assembly having a positive connection with the movable element with which it is associated at all times, eliminating the necessity for engaging or disengaging the elements to effect operation.

It is to be understood that the invention is not to be restricted to the details set forth since these may be modified within the scope of the appended claims without departing from the spirit and scope of the invention.

Having thus described the invention, what we claim to be new and desire to secure by Letters Patent is:

1. In a means for controllably locking a rotatable element with respect to a stationary element, the combination of a fluid-filled cylinder means for pivotally supporting said cylinder on one of said elements, a piston rod extending through said cylinder, a piston in said cylinder secured to said piston rod, connecting means between one end of said piston rod and the other of said elements, a passage from one side of said piston to the other, valve means associated with said passage to control the flow of fluid from one side of said piston to the other, and an electric actuator supported on and movable with the free end of said piston rod operatively connected with said valve means to control its operation.

2. In a hydraulic mechanism for controllably locking a rotatable element with respect to a relatively stationary element comprising a fluid filled cylinder, means for pivotally supporting said cylinder on one of said elements, said cylinder having a piston and piston rod assembly in said cylinder connected to the other of said elements, the combination of a first passage extending from one side of said piston to the other, a valve associated with said first passage having an operative connection with said piston rod, a second passage through said piston having a metering orifice, and an electric actuator supported on and movable with the free end of said piston rod operatively connected to said valve to control its operation selectively.

3. In a hydraulic mechanism for controllably locking a rotatable element with respect to a relatively stationary element comprising a fluid-filled cylinder, means for pivotally supporting said cylinder on said stationary element, said cylinder having a piston and piston rod assembly in said cylinder with one end of said piston rod pivotally connected to said rotatable element, the combination of a first passage extending from one side of said piston to the other, a valve associated with said first passage, a second passage through said piston having a metering orifice, and an electric actuator operatively connected to said valve and supported on and movable with the free end of said piston rod.

4. A device for controllably locking a rotatable element with respect to a stationary element comprising a fluid-filled cylinder adapted to be pivotally supported on one end of said elements, a hollow piston rod extending through said cylinder having one end connected to the other of said elements, a piston secured to said piston rod within said cylinder having openings on either lateral face thereof, passages from said openings communicating with the internal bore of said hollow piston rod, valve means in said piston rod adapted to open or close communication between said passages, and an electric actuator supported on and movable with the free end of said piston rod operatively connected with said valve means to effect its operation.

5. A hydraulic actuating mechanism for controlling the position of one movable element with respect to another comprising a fluid-filled cylinder adapted to be supported on one of said elements, a piston and piston rod assembly within said cylinder connected to the other of said elements, a first passage from one side of said piston to the other, valve means associated with said first passage to selectively control the flow of fluid therethrough, a second passage from one side of said piston to the other having a metering orifice, and snubbing means slidably mounted within said cylinder adjacent one end thereof adapted to close said first passage and restrict the flow of fluid from one side of said piston to the other through said second passage at the end of the stroke of said piston in the direction of said snubbing means.

6. A hydraulic actuating mechanism for controlling the position of one movable element with respect to another comprising a fluid-filled cylinder adapted to be supported on one of said elements, a piston and piston rod assembly within said cylinder connected to the other of said elements, a first passage extending through said piston rod providing communication from one side of said piston to the other, valve means associated with said first passage to selectively control the flow of fluid therethrough, a second passage through said piston having a metering orifice, and snubbing means comprising a resiliently biased plunger slidably supported within said cylinder adjacent one end thereof adapted to close said first passage and restrict the flow of fluid from one side of said piston to the other through said second passage at the end of the stroke of said piston in the direction of said snubbing means.

7. A hydraulic actuating mechanism for controlling the position of one movable element with respect to another comprising a fluid-filled cylinder adapted to be supported on one of said elements, a piston and piston rod assembly within said cylinder connected to the other of said elements, a first passage extending through said piston rod providing communication from one side of said piston to the other, valve means associated with said first passage to selectively control the flow of fluid therethrough, a second passage through said piston having a metering orifice, and snubbing means disposed at both ends of said cylinder comprising a resiliently biased plunger slidably supported therein adapted to close said first passage and restrict the flow of fluid from one side of said piston to the other through said second passage at either end of the stroke of said piston.

8. In combination with an airplane having a landing gear and a control surface, a gust lock for preventing uncontrolled movement of said control surface with respect to its supporting structure comprising a fluid-filled cylinder pivotally mounted on the supporting structure having a piston and a piston rod operatively connecting said control surface and said supporting structure, a fluid connection from one side of said piston to the other, valve means associated with said fluid connection, electric actuating means operatively connected to said valve means and supported on and movable with said piston rod, a power source, control means for energizing said actuating means from said power source, and means associated with said landing gear and connected to said control means to maintain said valve means in an open position when said aircraft is airborne.

9. In combination with an airplane having a landing gear and a control surface, a gust lock for preventing uncontrolled movement of said control surface with respect to its supporting structure comprising a fluid-filled cylinder pivotally mounted on the supporting structure having a piston and piston rod operatively connecting said control surface and said supporting structure, a passage through said piston, a by-pass valve associated with said passage, an electric actuator operatively connected to said by-pass valve and supported on and movable with said piston rod, a source of electrical energy, remote control circuit for energizing said actuator from said power source to open and close said by-pass valve, and a switch associated with said landing gear and connected with said control means to maintain said valve means in an open position when said aircraft is airborne.

10. In an aircraft having a pilot operable control surface movably supported on the aircraft structure, a landing gear including an oleo strut, means interconnecting said control surface and said structure having a free position whereby the movement of said control surface is unrestrained and a locked position whereby the rate of movement of said control surface with respect to said structure is restricted, manually operable remote control means connected to said interconnecting means for effecting its actuation, and actuating means associated with said landing gear and connected to said control means operable on movement of said oleo to prevent actuation of said interconnecting means into its locked position when said aircraft is airborne.

RONALD E. CRANDALL.
PETER S. KLEVEN.
LEE E. BALDWIN.

References Cited in the file of this patent

UNITED STATES PATENTS

| Number | Name | Date |
|---|---|---|
| 1,176,036 | Dailey | Mar. 21, 1916 |
| 1,592,912 | Thompson | July 20, 1926 |
| 1,945,499 | Flarsheim | Jan. 30, 1934 |
| 2,022,599 | Leuschner | Nov. 26, 1935 |
| 2,068,578 | Stronach | Jan. 19, 1937 |
| 2,144,135 | Zindel | Jan. 17, 1939 |
| 2,366,382 | Burton | Jan. 2, 1945 |
| 2,379,750 | Rossman | July 3, 1945 |
| 2,389,274 | Pearsall | Nov. 20, 1945 |
| 2,402,065 | Martin | June 11, 1946 |
| 2,493,290 | Hearne | Jan. 3, 1950 |
| 2,559,968 | Katz | July 10, 1951 |

FOREIGN PATENTS

| Number | Country | Date |
|---|---|---|
| 351,036 | Italy | Aug. 2, 1937 |